Patented Oct. 2, 1945

2,385,793

UNITED STATES PATENT OFFICE 2,385,793

PRINTING INK

Everett F. Carman, Rutherford, N. J., and Walther Reil, New York, N. Y., assignors to Interchemical Corporation, New York, N. Y., a corporation of Ohio No Drawing. Application February 7, 1942, Serial No. 429,960

3 Claims. (Cl. 106—29)

This invention relates to inks for use in printing porous stock or paper, such as is used in newspapers, telephone books and some magazines, and aims to provide an improved ink for this purpose which eliminates smudging, offsetting and strike-through, and permits the use of thinner and hence cheaper paper, all without sacrifice in speed of printing or economy in the ink itself.

Printing of newspapers, telephone books and magazines on porous stock differs from other printing operations in that very high press speeds are required, the stock is very absorbent and the ultimate cost of the finished product is of paramount importance. The usual cheap inks for this purpose are made by dispersing pigment in very high boiling (and hence press-stable) petroleum fractions which are known to the trade as ink-oils. Such inks are non-drying in the ordinary sense but dry by penetration of the oil into the porous stock to a point where the printed product may be handled. However, this penetration occurs for a long time after printing and consequently the attainment of real drying is very slow. Moreover, if downward penetration is too great, the print becomes visible from the opposite side of the paper and creates the condition known as "strike-through" which necessitates the use of rather heavy stock with the inks now commercially available; or if outward penetration or spreading of the ink is too great, it causes a lack of clarity in the outlines of the printed matter. Another objection to the standard news inks is their lack of a tenacious binder so that when relatively large proportions of pigment are used, there is a decided tendency for the color to smudge.

In attempts to provide a different type of ink for printing porous stock which may not be subject to all of these disadvantages, it has been suggested that a cheap ink could be formulated by using water as part of the vehicle for the pigment. However, all attempts to use water in this manner have been uniformly unsuccessful. This has been due primarily to the fact that water does not adhere well to the metals used in both the printing surfaces and ink distributing rollers of the usual typographic printing press so that proper inking of the type cannot be accomplished. But even where the wetting properties of the water ink have been improved, the presence of water in the ink has resulted in "filling" of the printing plates. This is probably caused both by the tackiness of the ink and the absorption by the porous paper of sufficient water to become soft so that small pulp fibers are picked up by the plates and eventually fill in the printing surfaces to a point where proper printing of half tones cannot be effected. Furthermore, due to the materials from which prior-attempted water inks have been formulated, they have not been sufficiently stable to permit restarting the presses without wash-up after 24 hour shutdowns, and it has not been possible to operate at sufficiently high speed to produce from 40,000 to 55,000 impressions per hour.

We have discovered that all of the above-mentioned difficulties can be overcome and have invented an improved ink for printing porous stock at the high speeds now being used in printing newspapers. Our new ink is made with a vehicle comprising an aqueous dispersion of a trialkylol amine soap of talloil.

Talloil is a liquid resin obtained in digesting pine wood to wood pulp. It is a dark brown, viscous oil, liquid at —20° C., easily soluble in alcohol, ether and acetone and partially soluble in benzene and turpentine oil. The principal constituents of talloil are:

| | Per cent |
|---|---|
| Resin acids | 30–45 |
| Fatty acids | 45–60 |
| Unsaponifiable matter | 6–12 |

The unsaponifiable matter is a yellow viscous oil containing waxy and pitchy material including sterols and various unknown materials. The pitch may be removed from the crude talloil by conventional methods to yield a refined talloil. When we refer to talloil herein, we mean to include crude talloil, refined oil and talloil pitch.

Enough talloil should be used in our new compositions to obtain the required body in the ink vehicle and this is saponified with a sufficient amount of the trialkylol amine to obtain complete saponification of the talloil. In our preferred compositions, we have found that from about 20–30% of talloil reacted with from 8–15% of the trialkylol amine and from 45–60% of water, or a mixture of water and a water-miscible solvent, provides a vehicle in which pigment may be dispersed to produce an ink of suitable consistency for high speed newspaper printing. The proportion of talloil to trialkylol amine used is such that the soap alone will have a viscosity of from 40 poises to 150 poises. However, the addition of the water and other ingredients reduces the viscosity of the finished ink to from 4 to 6 poises.

Such compositions are properly press-stable so that even if most of the water evaporates during periods when the presses are not in operation, they may be started again without wash-up. This is due to the fact that the talloil soaps themselves are liquid, and although of rather high viscosity as indicated above, they become suitably thinned when the operation of the press is again started.

Our experiments have shown that when an ink embodying the principles of our invention is printed on porous stock, there is an initial rapid drying by absorption of the ink into the paper. However, since the paper is acid, a reaction between the paper and the talloil soap takes place immediately causing neutralization of the soap to form free talloil acid. The free talloil acid is heavy in body and acts to bind the pigment to the paper and prevent penetration. Either this reaction or the hydrophilic properties of the paper effectively prevents strike-through. In fact, the results obtained with our new ink are so superior that considerably thinner paper may be used. Furthermore, while large proportions of water are used in the new compositions, the inks transfer properly in the ink distributing systems and to the type and all filling of the printing plates is eliminated.

Typical examples of inks embodying the principles of our invention are as follows:

*Example 1*

| | Per cent |
|---|---|
| Talloil | 20.0 |
| Talloil pitch | 10.0 |
| Triethanolamine | 10.0 |
| Water | 45.8 |
| "Cellosolve" | 4.0 |
| Aerosol (alkaryl sulfonate) | 0.7 |
| Glycerine | 2.0 |
| Carbon Black | 7.0 |
| Methyl Violet | 0.5 |

This ink was made by adding the triethanolamine to the talloil and talloil pitch. After the exothermic reaction was completed, the water, pigment and other ingredients were stirred into the soap and the resulting material ground on a suitable ink mill. This yielded a black ink having a viscosity of from 4 to 6 poises at normal room temperature and suitable for high speed printing on porous stock.

*Example 2*

| | Per cent |
|---|---|
| Talloil | 12.5 |
| Talloil pitch | 16.9 |
| Triethanolamine | 14.0 |
| Water | 45.0 |
| Carbon Black | 9.0 |
| Methyl Violet | 2.6 |

*Example 3*

| | Per cent |
|---|---|
| Talloil | 7.7 |
| Talloil pitch | 12.2 |
| Triethanolamine | 9.2 |
| Water | 57.0 |
| Carbon Black | 11.8 |
| Methyl Violet | 2.1 |

*Example 4*

| | Per cent |
|---|---|
| Talloil | 20.31 |
| Resin (modified phenolic) | 2.70 |
| Triethanolamine | 8.11 |
| Water | 40.50 |
| "Cellosolve" | 4.32 |
| Diethylene glycol | 14.87 |
| Carbon Black | 8.65 |
| Methyl Violet | 0.54 |

Each of the inks of Examples 2, 3 and 4 was compounded in the same manner as the ink of Example 1 and yielded similar results. Where resin is used, it is added to the talloil before saponification.

While the above examples indicate that small percentages of resin may be used in the compositions, the talloil cannot be completely substituted with such materials.

In addition to triethanolamine, we have found that tri-isopropanolamine and other water-soluble trialkylol amines may be used to form the trialkylol amine soap in accordance with our invention.

What we claim is:

1. A printing ink consisting of pigment dispersed in a vehicle comprising an aqueous dispersion of a trialkylol amine soap of talloil, the talloil and water being present in relative amounts sufficient to produce the consistency of ordinary news ink and there being sufficient water-soluble trialkylol amine to obtain complete saponification of the talloil, and produce a liquid soap.

2. A printing ink consisting of pigment dispersed in a vehicle comprising from 20 to 30% of talloil, 8 to 15% of triethanolamine, and from 45 to 60% of water.

3. A printing ink consisting of pigment dispersed in a vehicle comprising an aqueous dispersion of a trialkylol amine soap of talloil, the talloil and water-soluble trialkylol amine being present in sufficient quantities to produce a liquid soap having a viscosity of from 40 to 150 poises, and the water being present in such amount that the ink has the consistency of ordinary news ink.

EVERETT F. CARMAN.
WALTHER REIL.